United States Patent [19]
Wyler

[11] 3,940,985
[45] Mar. 2, 1976

[54] FLUID FLOW MEASUREMENT SYSTEM FOR PIPES

[75] Inventor: John S. Wyler, W. Chester, Pa.

[73] Assignee: Westinghouse Electric Corporation, Pittsburgh, Pa.

[22] Filed: Apr. 18, 1975

[21] Appl. No.: 569,630

[52] U.S. Cl. ............................................... 73/194 A
[51] Int. Cl.² ............................................ G01F 1/66
[58] Field of Search .................................. 73/194 A

[56] References Cited
UNITED STATES PATENTS

| | | | |
|---|---|---|---|
| 3,546,935 | 12/1970 | Bruha | 73/194 A |
| 3,564,912 | 2/1971 | Malone et al. | 73/194 A |

*Primary Examiner*—Charles A. Ruehl
*Attorney, Agent, or Firm*—D. Schron

[57] ABSTRACT

A plurality of transducers are positioned in the walls of a pipe conveying a fluid, the volumetric flow rate of which is to be measured. Opposed upstream and downstream transducers project acoustic energy toward one another through the fluid, along a plurality of parallel paths. Electronic circuitry coupled to the transducers provides an indication of the fluid velocity component along these paths and the values are modified by predetermined weighting factors. The transducers are placed in the pipe such that the acoustic paths are positioned at certain distances with respect to a reference.

5 Claims, 8 Drawing Figures

FLUID FLOW MEASUREMENT SYSTEM FOR PIPES

BACKGROUND OF THE INVENTION

1. Field of the Invention:

The invention in general relates to fluid flow measurements and particularly to a system for measuring volumetric flow rates in a pipe.

2. Description of the Prior Art:

Various systems exist for measuring volumetric flow rate in a fluid carrying conveyance. For many uses of such systems accuracy is of prime consideration in that an error, for example, of one percent in fluid flow measurement can represent many thousands of dollars. Accurate knowledge of volumetric flow rate is required for situations such as metering water to communities, measuring efficiency of various hydroelectric equipment, sewage treatment plants, and oil pipeline monitoring to name a few.

A highly accurate flow meter system is described in U.S. Pat. No. 3,564,912. That system utilizes pairs of transducers installed at the boundary of a fluid conveyance so as to form parallel acoustic paths, and measurements taken in these several acoustic paths indicative average fluid velocity times path length are combined according to a numerical integration technique to compute volumetric flow.

The present invention describes an alternate arrangement for use specifically with circular pipes with an integration scheme based on direct measurement of path velocity.

SUMMARY OF THE INVENTION

The present invention provides a measurement of volumetric flow rate of a fluid in a circular pipe of radius R and includes means for obtaining measurements indicative of average fluid velocity along a plurality of paths in the pipe. Preferably these measurements are obtained with opposed upstream and downstream transducers projecting acoustic energy toward one another along the paths. Circuit means are provided for modifying these measurements, the modifications including the application of a certain weighting factor $W_i$. These modified measurements are summed, the resultant being volumetric flow rate, $Q$. The opposed upstream and downstream transducers are positioned in the boundary of the pipe such that each acoustic path is positioned at a respective distance $x_i$ from the center of the pipe, where $i$ is a particular path number, $$w_i = \frac{\pi}{n+1} \text{Sin}^2 \frac{i\pi}{n+1}$$

and $$x_i = \cos \frac{i\pi}{n+1}$$

DESCRIPTION OF THE PREFERRED EMBODIMENT

Figure 1:
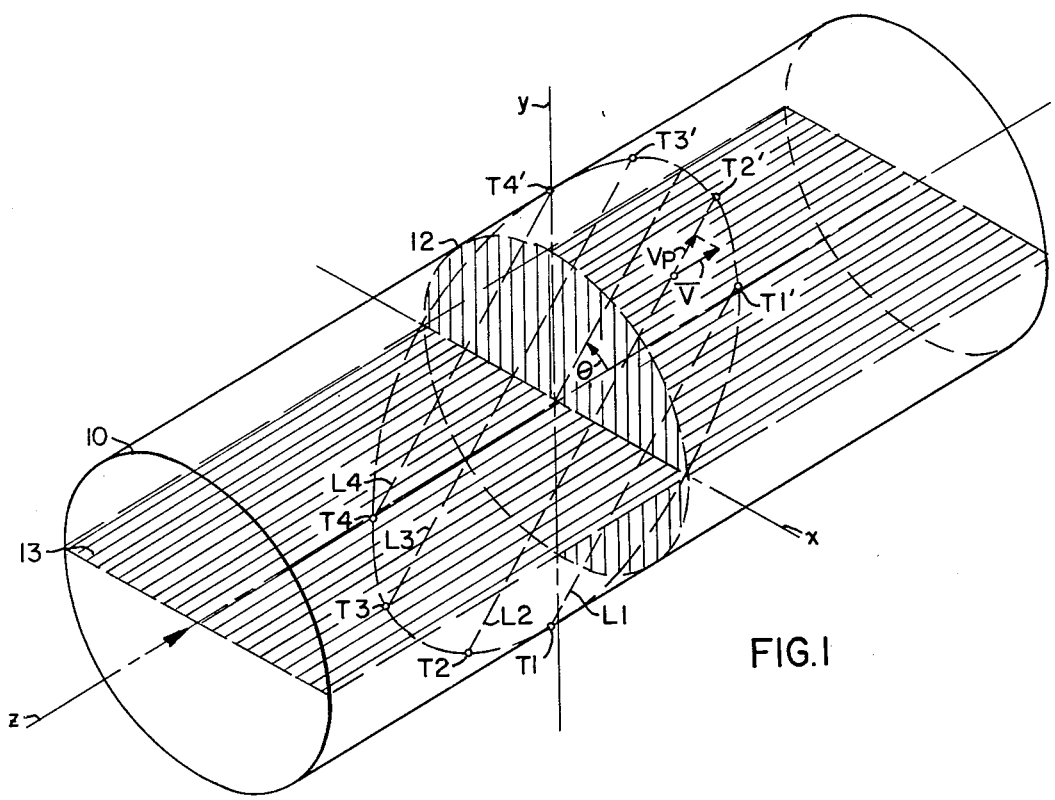
FIG. 1 represents a section of circular pipe illustrating certain transducer positioning.

In FIG. 1 cylinder 10 represents a circular fluid conveying pipe oriented with respect to an $xyz$ coordinate system and wherein resultant fluid flow is along the $z$ axis as indicated by the arrow. A first reference plane 12 terminates in the boundaries of the cylinder 10 and lies in the $xy$ plane, and for the orientation illustrated in FIG. 1, is vertical. A second reference plane 13 terminates in the boundaries of the cylinder 10 and lies in the $xz$ plane, which is horizontal, and perpendicular to the first reference plane 12.

In the present system, fluid velocity indicative measurements are obtained by well known acoustic methods and accordingly the arrangement includes a plurality of upstream and downstream transducers disposed at the surface of cylinder 10. By way of illustration four transducer pairs are shown, with the upstream transducers being designated T1 to T4, and the corresponding downstream transducers being designated T1' to T4'. The transducer pairs are arranged to project acoustic energy toward one another at a certain angle $\theta$ with respect to fluid flow along an acoustic path designated respectively L1, L2, L3, and L4 for the four transducer pairs illustrated.

Figures 2, 2A:
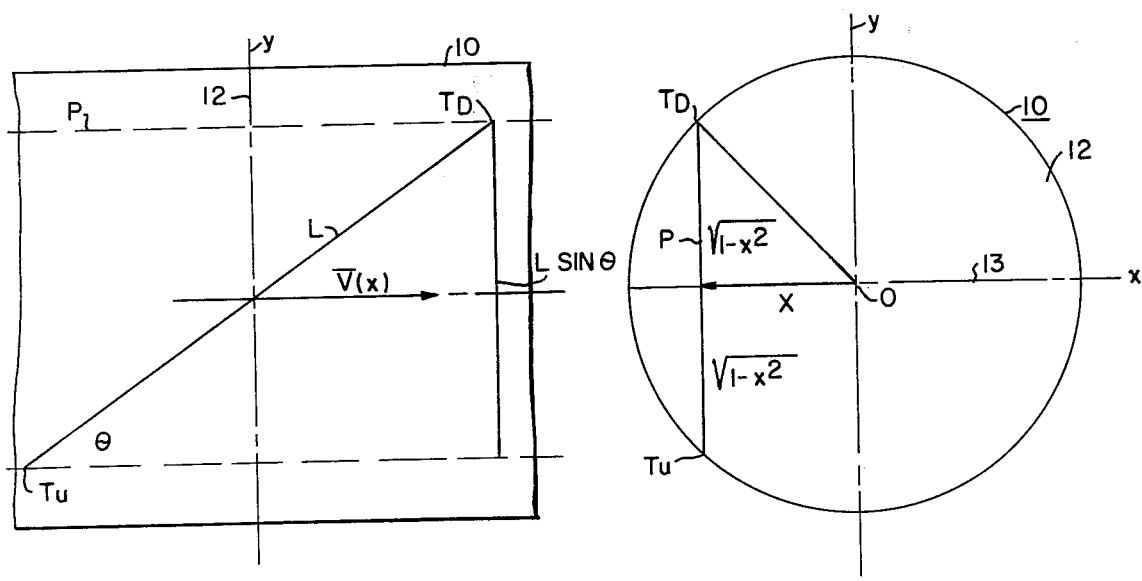
FIGS. 2 and 2A are views along the $x$ axis and $z$ axis respectively of a pipe, and serve to define certain terms.

FIG. 2 shows the cylinder 10 looking in along the $x$ axis and illustrates the general case of opposed upstream and downstream transducers designated $Tu$ and $T_D$ respectively and separated by an acoustic path length, designated L. The acoustic path lies in a plane P which would be parallel to the $yz$ plane, and the path is at an angle $\theta$ with respect to average fluid velocity $\overline{v}(x)$ in plane P. The projection of the acoustic path onto the first reference plane 12 would be the same as the line designated L Sin $\theta$.

FIG. 2A is a view of FIG. 2 looking in along the $z$ axis. In order to derive the mathematical relationships which follow, the cylinder 10 is assumed to have a unit radius (R=1). In FIG. 2A the vertical line between transducers $Tu$ and $T_D$ is the plane P of FIG. 2 and is also the line L Sin $\theta$. With the plane P being at a distance $x$ from the center O, the upper half of the line would be, by geometry, $$\sqrt{1-x^2}.$$

The lower half of the line would also have the same value $$\sqrt{1-x^2}.$$

The volumetric flow rate $Q$ can be defined by the area integral:

$$Q = \int_X \int_Y v(x,y) \, dy \, dx$$

Since $$Q = A\bar{v}$$

$$\bar{v} = \frac{1}{A} \int_X \int_Y v(x,y) \, dy \, dx$$

for a circle of unit radius, $$A = \pi,$$

so that:

$$\bar{v} = \frac{1}{\pi} \int_X \left[ \int_Y v(x,y) \, dy \right] dx \qquad (1)$$

Integration of the term in brackets between limits of $y = -\sqrt{1-x^2}$ to $y = +\sqrt{1-x^2}$:

$$\int_{-\sqrt{1-x^2}}^{\sqrt{1-x^2}} v(x,y) \, dy = \bar{v}(x) \, 2\sqrt{1-x^2}$$

where $\bar{v}(x)$ is the average velocity over the path from $y = -\sqrt{1-x^2}$ to $y = +\sqrt{1-x^2}$ at some value, $x$.

The value of the integral is the average of the integrand $\bar{v}(x)$ times the path length $2\sqrt{1-x^2}$.

Substituting back into eq. (1)

$$\bar{v} = \frac{2}{\pi} \int_X \bar{v}(x) \sqrt{1-x^2} \, dx$$

for a circle of unit radius the limits on $x$ are $x = -1$ to $x = +1$:

$$\bar{v} = \frac{2}{\pi} \int_{-1}^{+1} \bar{v}(x) \sqrt{1-x^2} \, dx \qquad (2)$$

Eq. (2) is in the form of:

$$\int_{-1}^{+1} f(x) \sqrt{1-x^2} \, dx$$

To a good approximation the integration of Eq. (2) may be performed numerically by choosing discrete values for x. That is:

$$\int_{-1}^{+1} f(x) \sqrt{1-x^2} \, dx = \sum_{i=1}^{n} w_i f(x_i) \qquad (3)$$

where
$n$ = the total number of paths
$i$ = a particular path number $$x_i = \cos \frac{i\pi}{n+1} \qquad (4)$$

$$w_i = \frac{\pi}{n+1} \sin^2 \frac{i\pi}{n+1} \qquad (5)$$

Eq. (3) is a well known mathematical relationship which may be found for example in the Handbook of Mathematical Functions of the National Bureau of Standards - Applied Mathematical Series 55 at page 889. For the treatment here, a remainder given in Eq. (25.4.40) of that text is negligible and may be neglected.

Figure 3:
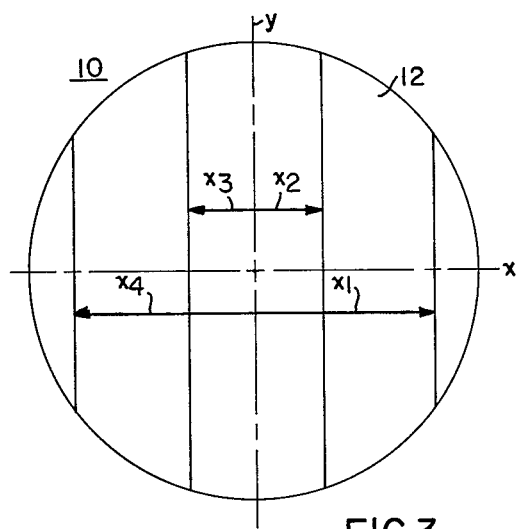
FIG. 3 is a view along the $z$ axis of FIG. 1 illustrating the positioning of certain paths.

Equating $f(x)$ with $\bar{v}(x)$:

$$\bar{v} = \frac{2}{\pi} \sum_{i=1}^{n} w_i \bar{v}(x_i) \qquad (6)$$

for a four path system as illustrated in FIG. 1, $n = 4$ and for i = 1    $x_1 = 0.8090$
for i = 2    $x_2 = 0.3090$
for i = 3    $x_3 = -0.3090$
for i = 4    $x_4 = -0.8090$ These relative distances are illustrated in FIG. 3 wherein the vertical lines are the projections of the acoustic paths onto the reference plane 12.

For a circular pipe of radius $R$ these values of $x_i$ would be multiplied by $R$ to obtain actual values for proper transducer placement according to the present invention.

Figure 4A:
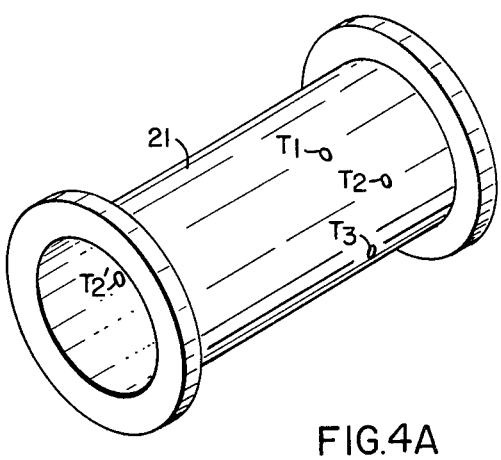
FIG. 4A illustrates a portion of FIG. 4 in greater detail.
Figure 4:
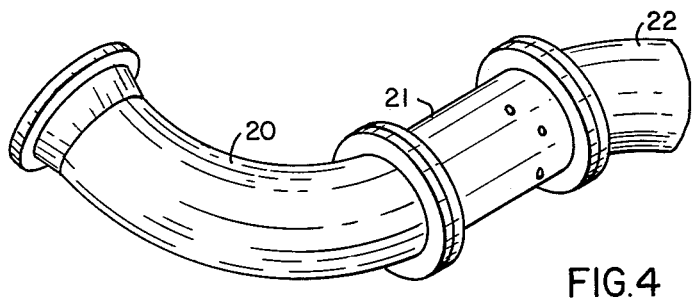
FIG. 4 illustrates a typical installation of the present invention.

The transducer placements in a pipe need not be such that the projections of the acoustic paths are vertical, as in FIG. 3. By way of example, FIG. 4 illustrates a plurality of fluid conveying pipe sections 20, 21 and 22 with the straight pipe section 21 being the section utilized for volumetric flow measurement, and being illustrated in somewhat more detail in FIG. 4A. The upstream and downstream transducers would be located in the walls of the pipe 21, as is common practice, and several of these transducers are illustrated. For the arrangement of FIG. 4A, the acoustic paths between respective upstream and downstream transducer pairs are horizontal and are spaced from the center of the pipe in accordance with the $x_i$ values previously discussed.

The average velocity $\bar{v}(x)$ over a particular path can be determined from time difference measurements. That is if $t_1$ is the time it takes an acoustic pulse to travel from the upstream to downstream transducer, (with the fluid flow) then $$t_1 = \frac{L}{C + v_p}$$

where
  $L$ is the acoustic path length
  $C$ is the speed of sound in the fluid
  $v_p$ is the fluid velocity component along the path L.

Similarly, if $t_2$ is the time it takes the acoustic pulse to travel from the downstream to the upstream transducer (against the fluid flow) then $$t_2 = \frac{L}{C - v_p}.$$

Rearranging:

$$C + v_p = \frac{L}{t_1}$$

$$C - v_p = \frac{L}{t_2}$$

subtracting these two equations and solving for $v_p$:

$$v_p = \frac{L(t_2 - t_1)}{2t_1 t_2}$$

from geometry:

$$v_p = \bar{v}(x) \cos \theta.$$

The expression $(t_2 - t_1)$ is the difference in transit time of acoustic energy propagated from the downstream to the upstream transducer and vice versa, and is represented by the quantity $\Delta t$. Since $t_2 = t_1 + \Delta t$:

$$\bar{v}(x) = \frac{L(\Delta t)}{2 \cos \theta \, t_1(t_1 + \Delta t)} \qquad (7)$$

Substituting equation 7 into equation 6:

$$\bar{v} = \frac{2}{\pi} \sum_{i=1}^{n} w_i \frac{Li}{2\cos\theta_i} \left[ \frac{\Delta t}{t_1(t_1 + \Delta t)} \right]_i$$

volumetric flow rate for a pipe of radius R is then:

$$Q = A\bar{v} = R^2 \sum_{i=1}^{n} w_i \frac{Li}{\cos\theta_i} \left[ \frac{\Delta t}{t_1(t_1 + \Delta t)} \right]_i \qquad (8)$$

Figure 5:
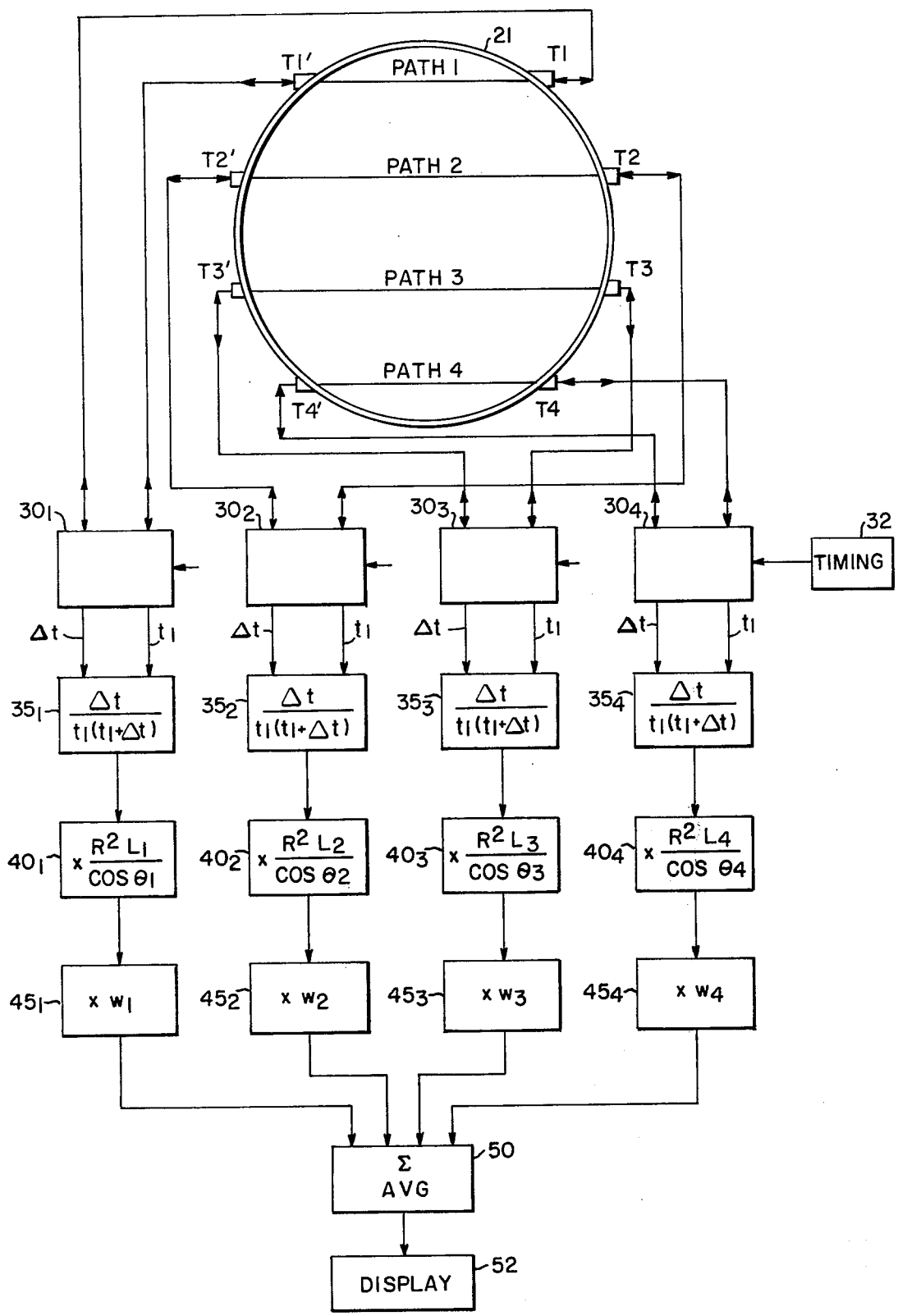
FIG. 5 is a block diagram illustrating circuitry which may be used to perform certain calculations.

Apparatus for obtaining the flow rate $Q$ in accordance with the relationship of Equation 8, is illustrated by way of example in FIG. 5. A section of pipe, for example, the pipe 21, illustrated in FIG. 4B is shown and includes opposed upstream and downstream transducers $T_1$ to $T_4$ and $T_1'$ to $T_4'$ respectively. In one well known type of apparatus the upstream and downstream transducers of a pair are energized simultaneously such that an acoustic pulse is simultaneously transmitted from each transducer to the opposing transducer along the path. The difference $\Delta t$ in arrival or transit time of the projected acoustic pulses is obtained, as well as an indication of the upstream to downstream transit time, $t_1$. The transmit/receive circuitry for performing this function is designated $30_1$ for path 1, $30_2$ for path 2, $30_3$ for path 3, and $30_4$ for path 4. These circuits are all under control of a master timing circuit 32.

Each transmit/receive circuit therefore provides an output signal indicative of $\Delta t$ and $t_1$ for a particular path. Having these values, the mathematical manipulation may be carried out in a variety of ways. For example, in the embodiment of FIG. 5, electronic circuitry $35_1$ to $35_4$ is provided for operating on the two received values $\Delta t$ and $t_1$ to provide an indication of $$\frac{\Delta t}{t_1(t_1 + \Delta t)}.$$

These values are then multiplied in respective electronic circuits $40_1$ to $40_4$ by the value $$\frac{R^2 Li}{\cos \theta_i}.$$

In accordance with the present invention, and as indicated by equation 8, the thus obtained values are multiplied by a certain weighting factor in electronic circuit sections $45_1$ to $45_4$. For a four path system, $n = 4$ and for  i = 1    $w_1 = 0.2171$
     i = 2    $w_2 = 0.5683$
     i = 3    $w_3 = 0.5683$
     i = 4    $w_4 = 0.2171$ The individual values obtained for each path are then summed together and the summation for a predetermined number of repetitive acoustic pulse transmissions are averaged in electronic circuit section 50 to provide an output signal to a display 52 or other utilization device.

Variations in the signal processing order are apparent to those skilled in the art, and in order to reduce the circuitry required, a substantial portion of two of the four signal processing channels may be eliminated since the path 1 parameters are nominally identical with the path 4 parameter, as are path 2 and 3 parameters.

Figure 6:
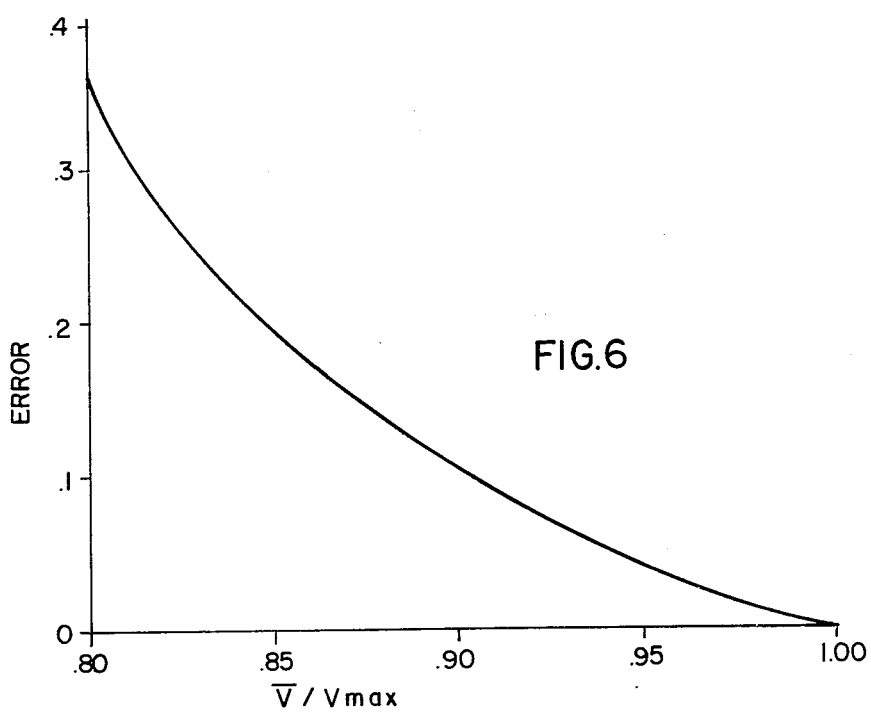
FIG. 6 is a curve illustrating error present as a function of Reynolds number.

The present arrangement of particularly placed velocity measurement paths in a circular pipe, together with predetermined weighting factors, results in a very highly accurate flow measurement system. The error is relatively low over a particular range of use such as illustrated in FIG. 6. In the field of fluid flow, Reynolds number is a function of the density of the fluid, the average velocity in, and the diameter of, the pipe, and the dynamic viscosity of the fluid. An indication of Reynolds number is the ratio of the average velocity to the maximum velocity and this ratio is plotted on the horizontal axis of FIG. 6, and relative error is plotted on the vertical axis. The curve which illustrates the error, may be used as a correction curve which, it is seen, approaches zero at a Reynolds number of infinity $$\left( \frac{\bar{v}}{v_{max}} = 1 \right).$$

Although only four paths have been illustrated by way of example, fewer or a greater number of paths may be utilized with the larger number of paths resulting in a more accurate system. For example in accordance with the present invention for a five path system ($n = 5$) the following values of $x_i$ and $w_i$ would be used.

| for | | | |
|---|---|---|---|
| | i = 1 | $x_1 = 0.8660$ | $w_1$ 0.1309 |
| | i = 2 | $x_2 = 0.5000$ | $w_2$ 0.3927 |
| | i = 3 | $x_3 = 0$ | $w_3$ 0.5236 |
| | i = 4 | $x_4 = -0.5000$ | $w_4$ 0.3927 |
| | i = 5 | $x_5 = -0.8660$ | $w_5$ 0.1309 |

I claim:

1. Flowmeter apparatus for measuring volumetric flow rate in a pipe of radius $R$, comprising:
   a. means for obtaining measurements indicative of average fluid velocity along $n$ paths in said pipe;

b. means for modifying said measurements including the application of weighting factors $w_i$;
c. means for summing said modified measurements;
d. each said path being positioned such that the projection of the path onto a reference plane perpendicular to fluid flow in said pipe is located at a distance of $Rx_i$ from the center of said pipe;
e. where:

$i$ is a particular path number, $$w_i = \frac{\pi}{n+1}\sin^2\frac{i\pi}{n+1}, \text{ and}$$

$$x_i = \cos\frac{i\pi}{n+1}.$$

2. Apparatus according to claim 1 wherein:

a. said means for obtaining measurements includes a plurality of pairs of transducers operable to project and receive acoustic energy through the fluid in said pipe;
b. each said pair constituting a respective upstream and downstream transducer with the acoustic path between them constituting one of said $n$ paths.

3. Apparatus according to claim 1 wherein:
a. said paths are parallel to one another.

4. Apparatus according to claim 3 wherein:
a. said paths are all at the same angle $\theta$ with respect to resultant fluid flow direction.

5. Apparatus according to claim 4 wherein:
a. said modification includes multiplication by a trigonometric function of $\theta$.

* * * * *